United States Patent
Geis

(10) Patent No.: US 10,774,539 B2
(45) Date of Patent: Sep. 15, 2020

(54) METHOD FOR MOUNTING A STRETCHED FLEXIBLE COVERING ON A MOUNTING FRAME AND MOUNTING FRAME FOR IMPLEMENTING SAID METHOD

(71) Applicant: CLIPSO PRODUCTIONS, Vieux-Thann (FR)

(72) Inventor: Bernard Geis, Chavannes Pres Renens (CH)

(73) Assignee: CLIPSO PRODUCTIONS, Vieux-Thann (FR)

(*) Notice: Subject to any disclaimer, the term of this patent is extended or adjusted under 35 U.S.C. 154(b) by 0 days.

(21) Appl. No.: 16/481,586

(22) PCT Filed: Feb. 8, 2018

(86) PCT No.: PCT/EP2018/053154
§ 371 (c)(1),
(2) Date: Jul. 29, 2019

(87) PCT Pub. No.: WO2018/146186
PCT Pub. Date: Aug. 16, 2018

(65) Prior Publication Data
US 2020/0002953 A1    Jan. 2, 2020

(30) Foreign Application Priority Data

Feb. 13, 2017  (FR) ........................................ 17 51143
Sep. 13, 2017  (FR) ........................................ 17 58476

(51) Int. Cl.
E04F 13/00    (2006.01)
E04B 9/04     (2006.01)
E04B 9/30     (2006.01)

(52) U.S. Cl.
CPC .......... *E04F 13/005* (2013.01); *E04B 9/0435* (2013.01); *E04B 9/303* (2013.01); *E04B 2009/0492* (2013.01)

(58) Field of Classification Search
CPC .. E04F 13/005; E04F 13/0814; E04B 9/0435; E04B 9/303; E04B 9/306; F16B 5/0692
(Continued)

(56) References Cited

U.S. PATENT DOCUMENTS 4,788,806 A * 12/1988 Sease ...................... B44C 7/022
                                                        160/395
4,986,332 A    1/1991 Lanuza
(Continued)

FOREIGN PATENT DOCUMENTS

CA    2484907 A1 *  4/2005  ............... E06B 9/52
EP    2 597 217 A1   5/2013
(Continued)

OTHER PUBLICATIONS

International Search Report Corresponding to PCT/EP2018/053154 dated Apr. 9, 2018.
(Continued)

*Primary Examiner* — Jeanette E Chapman
(74) *Attorney, Agent, or Firm* — Davis & Bujold PLLC; Michael J. Bujold

(57) ABSTRACT

A mounting frame (100) which can be attached to a ceiling (3) and comprises an assembly of basic profiles (10) comprising a housing (14) for receiving an edge of a covering (1) and a plurality of V-shaped or U-shaped locking clips (50) designed to enter the receiving housing (14) and remain therein in a locked position in which the edge of the covering (1) is clamped between the locking clip (50) and the housing (14). Each locking clip (50) is interposed between an insertion tool and the covering (1) and facilitates the insertion of
(Continued)

the covering (1) into the receiving housing (14) without damaging the covering (1). The covering (1), with dimensions greater than those of the frame, can thus be completely removed and reused since the covering has not been damaged in any way, either while the covering (1) is being fitted or while being held in place.

4 Claims, 6 Drawing Sheets

(58) Field of Classification Search
USPC .......................................................... 52/222
See application file for complete search history.

(56) References Cited

U.S. PATENT DOCUMENTS

| | | | | |
|---|---|---|---|---|
| 5,029,422 | A * | 7/1991 | Scherrer | E04F 13/005 |
| | | | | 52/222 |
| 5,058,340 | A * | 10/1991 | Muller | E04B 9/303 |
| | | | | 160/395 |
| 5,380,120 | A * | 1/1995 | Vermeulen | A01G 9/1407 |
| | | | | 52/63 |
| 7,251,917 | B2 * | 8/2007 | Cvek | A47C 31/023 |
| | | | | 52/660 |
| 8,695,306 | B2 * | 4/2014 | Cvek | A47C 31/023 |
| | | | | 52/660 |
| 9,874,025 | B2 * | 1/2018 | Park | F21S 8/02 |
| 2011/0061320 | A1 * | 3/2011 | Scherrer | E04F 13/005 |
| | | | | 52/222 |
| 2017/0198480 | A1 | 7/2017 | Park | |

FOREIGN PATENT DOCUMENTS

| | | | | | |
|---|---|---|---|---|---|
| FR | | 2575243 | A1 * | 6/1986 | ........... E04H 15/646 |
| FR | | 2 823 779 | A1 | 10/2002 | |
| FR | | 2842229 | A1 * | 1/2004 | ............. E04B 9/303 |
| FR | | 2870273 | A1 * | 11/2005 | ............. E04B 9/303 |
| FR | | 2 928 674 | A1 | 9/2009 | |
| FR | | 3059689 | A1 * | 6/2018 | ............. A61L 9/014 |
| FR | | 3064015 | A1 * | 9/2018 | ............. E04F 13/005 |
| KR | | 2010-0000586 | U | 1/2010 | |
| WO | | 99/31330 | A1 | 6/1999 | |
| WO | WO-2009095200 | | A1 * | 8/2009 | ........... G09F 19/226 |
| WO | | 2013/111991 | A1 | 8/2013 | |
| WO | WO-2013111991 | | A1 * | 8/2013 | ............. E04B 9/303 |
| WO | WO-2016087733 | | A1 * | 6/2016 | ............. F21V 33/006 |

OTHER PUBLICATIONS

Written Opinion Corresponding to PCT/EP2018/053154 dated Apr. 9, 2018.

* cited by examiner

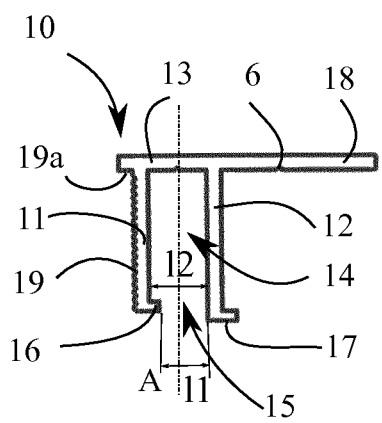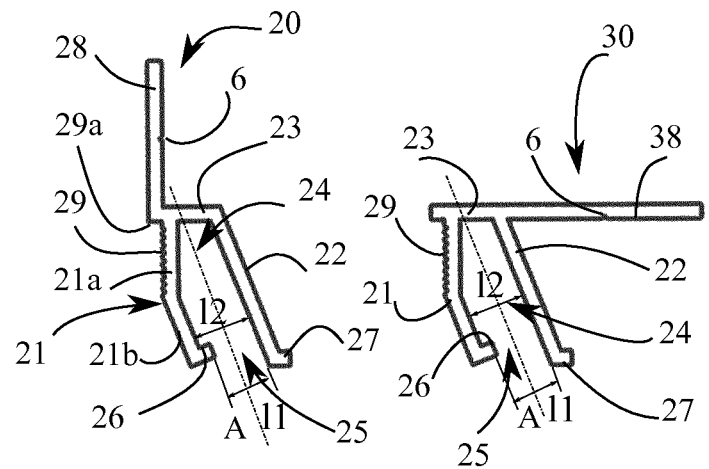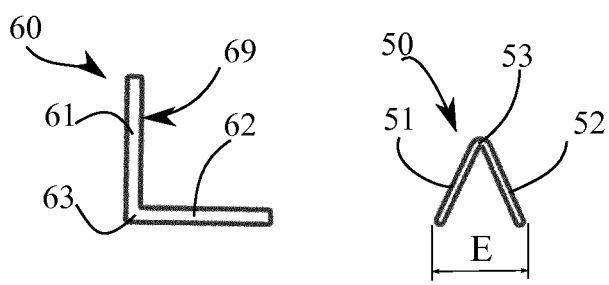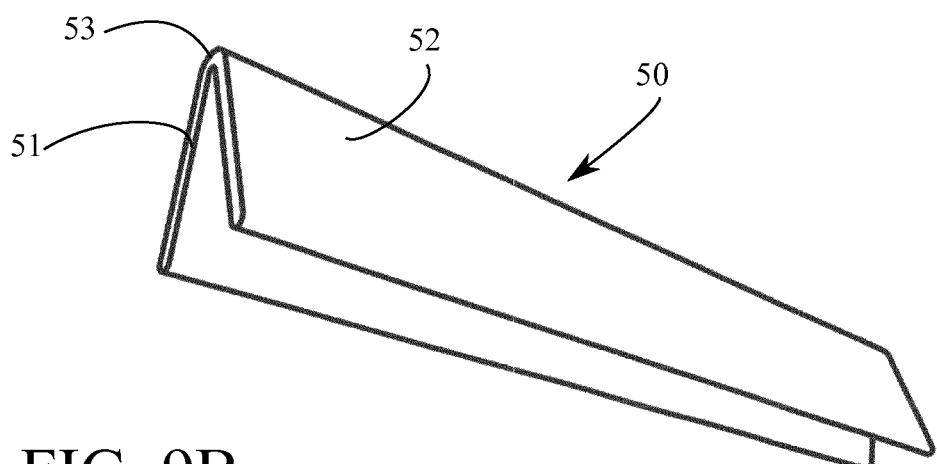
FIG. 5   FIG. 6   FIG. 7   FIG. 10   FIG. 9A   FIG. 9B

METHOD FOR MOUNTING A STRETCHED FLEXIBLE COVERING ON A MOUNTING FRAME AND MOUNTING FRAME FOR IMPLEMENTING SAID METHOD

TECHNICAL FIELD

The present invention relates to a method of mounting a flexible lining sheet stretched over a fastening frame, said lining sheet having dimensions greater than the dimensions of said frame, said fastening frame comprising at least one base profile assembly, each base profile comprising a cavity receiving an edge of said lining sheet and clamping means arranged to retain said edge of the lining sheet in said receiving cavity, wherein the edge of the lining sheet is introduced into said receiving cavity by means of a tool of insertion and is kept under tension by said clamping means.

The invention also relates to a fastening frame for implementing said mounting method, comprising at least one assembly of base profiles, each base profile comprising a cavity for receiving an edge of said coating and clamping means arranged for retaining said edge of the coating in said receiving housing.

PRIOR ART

Flexible lining sheet are widely used for covering walls, forming false ceilings, creating ambient chambers for example bright, false ceiling slabs, or the like. The term "flexible lining sheet" means woven fabrics coated or not, nonwoven webs coated or not, heat-shrinkable or thermo-shrinkable plastic films, etc. It is also known to use profiles in different forms to facilitate their installation and the patent literature is rich.

By way of example, mention may be made of publications EP 2 597 217 A1 and US 2017/0198480 A1, which propose to equip the peripheral edge of the flexible lining sheet with a hook-shaped hooking profile which slots with and self-locks inside a mounting profile, at the back of a hook. This fixing technique is however limited to PVC films or membranes that allow receiving the hook fixed by high frequency thermo-welding. Indeed, the hook which consists of a profile of thermoplastic material must be thermo-welded to the PVC flexible lining sheet continuously over its entire periphery before laying and in the factory by a thermo-welder. The hook-shaped profile is thus an integral and definitive part of the flexible lining sheet. In this laying technique, the flexible lining sheet must be slightly smaller than the dimensions of the frame to be able to cooperate precisely with said frame by heating said flexible lining sheet with a heat gun to increase its dimensions. After laying, the cooling coating retracts and automatically stretches to said frame. The manufacturing constraints of the lining sheet equipped with its attachment profile are large, given the necessary precision of its dimensions which must be adapted to those of the frame on which it is fixed. In this case, we speak of a made-to-measure manufacture.

By way of example, mention may be made of the following publications U.S. Pat. No. 4,986,332, WO 99/31330, FR 2 823 779 and FR 2 928 674, which propose fastening profiles in which the edges of the flexible lining sheet are held either by clamping between two flexible lips or two notched jaws belonging to said profile, or by locking by means of cylindrical rods reported in circular grooves of said profile. In this laying technique, the flexible lining sheet must be larger than the dimensions of the frame to be able to cooperate precisely with said frame, and then be cut flush after installation. The publication KR 2010 0000586 U proposes another fastening profile provided with a U-shaped receiving housing, provided with flexible lips extending transversely from one of its inner faces, and whose ends cooperate with fir tree arrangement notches provided on the other inner face, to form first means for maintaining an edge of the flexible lining sheet introduced into said housing with a spatula in direct contact with said lining sheet. It further comprises an elongated U-shaped locking member adapted to be introduced, in a second step, into the inlet of said housing and to form second means for holding the edge of the fabric in said fastening profile which extend over the entire periphery of the fastening frame. After its introduction, this locking member is no longer removable.

All these mounting solutions are very technical and generally require the intervention of a professional and the use of suitable tools. These tools, which are generally flat blade tools such as spatulas of particular shape, are directly applied to the lining sheet to force it into the fastening profile and, depending on the nature of the lining sheet, their blade can damage the face visible from the lining sheet if the installer is not careful enough. In the majority of existing mounting systems, disassembly and reassembly of the same lining sheet is generally not possible, because it is either torn by the jaws when trying to remove it from the fastener profile, or too much short since it is often cut flush with the mounting profile and its reduced dimensions after assembly no longer allow it to be stretched and rested.

PRESENTATION OF THE INVENTION

The present invention aims to overcome these disadvantages by proposing a mounting method and a fastening frame to standardize the manufacture of flexible lining sheets and greatly simplify the mounting of a flexible lining sheet on a fastening frame, which can be previously fixed on surfaces such as walls, a ceiling, or the like, or which can form a freestanding frame to make room boxes, slabs, or the like, and to consider the marketing of said frame in the form of a assembly kit making the assembly accessible to any unqualified person, without having recourse to specific tools, but to a standard tooling.

The object of the invention is also to allow the assembly and disassembly of the same lining sheet or a replacement lining sheet simply, quickly and without any deterioration of said lining sheet or assembly or disassembly, thus allowing its reuse, and thanks to the fact that said lining sheet retains larger dimensions than those of the frame even after disassembly, its excess not being but kept and concealed inside the fastening frame.

For this purpose, the invention relates to a mounting method of the kind indicated in the preamble, characterized in that as clamping means is used a plurality of locking clips having a V-shaped or U-shaped section, which are separated from said base profiles and said lining sheet and which have a length less than that of the base profiles, each locking clip being arranged to enter said receiving cavity and remain there in the locked position, and in that, to introduce an edge the lining sheet in the receiving cavity of a base profile, is reserved an excess of lining sheet beyond the edge to be introduced, is interposed a locking clip between the insertion tool and the edge of the lining sheet to be introduced, is simultaneously pushed the locking clip and the edge of the lining sheet to be introduced into said receiving cavity until reaching the locked position of said locking clip in which the edge of the lining sheet is retained by clamping between the locking clip and said cavity, is removed the insertion tool, are repeated these operations along the edges of the lining sheet to be introduced and on the periphery of said fastening frame using for each new operating a new locking clip that is positioned at a distance from the previous one, and is entered, with the help of said insertion tool, said excess of lining sheet in said receiving cavity directly or in the V-shaped or U-shaped section of said locking clips.

To stretch, adjust or remove said lining sheet with respect to said fastening frame, it is possible, in a first embodiment, to unlock one or more locking clips by pulling on the excess of the lining sheet remaining outside said fastening frame to compress the fastening clip and extracting it from said receiving cavity simultaneously with the corresponding edge of said lining sheet. It is also possible, in a more advantageous variant of the invention, to unlock one or more locking clips by exerting traction on a projecting disassembly tab provided on said locking clip, making it possible to compress the fixing clip, to extract it from said receiving cavity and simultaneously extracting the corresponding edge of said lining sheet.

After mounting the lining sheet on said fastening frame, it is preferably placed a finishing angle on each base section to close the receiving cavity and retain the excess of the lining sheet remaining outside said cavity.

For this purpose also, the invention relates to a fastening frame of the kind indicated in the preamble, characterized in that said clamping means comprise a plurality of locking clips having a V-shaped section or U, which are separate parts said base profiles and said lining sheet and which have a length less than that of the base profiles, and in that each locking clip is arranged to enter the receiving cavity and remain therein in a locked position in which an edge of the covering can being clamped between the locking clip and said cavity.

In a preferred embodiment, the base profile comprises at least two longitudinal wings, rigid, spaced from each other and assembled by a bottom to form an open longitudinal groove defining said receiving cavity provided with a inlet area, at least one of the longitudinal wings having a locking stop defining the locked position of said locking clips.

The locking stop is advantageously constituted by a flange extending in the direction of the other longitudinal wing to narrow the inlet area of said receiving cavity. The longitudinal wing which comprises said flange may correspond to the outer wing to said fastening frame depending on the destination of said frame.

In the preferred embodiment, the longitudinal wings extend in two substantially parallel planes delimiting between said receiving cavity and said inlet area which also extends in a plane substantially parallel to said wings.

Depending on the different embodiments, the longitudinal wings may extend vertically or horizontally, or in planes inclined along an axis relative to the vertical or horizontal.

Preferably, the locking clip consists of a section of flexible section provided with two branches assembled by a fold or curvature zone, forming a V or a U, having elastic properties, said locking clip being arranged to adopt an open position in the unlocked position in which the spacing at the end of its branches is greater than the width of the entrance area and the width of said receiving cavity.

One of the branches of the locking clip has a free end particularly adapted to lock behind the edge of the outer longitudinal flange of said base profile, when in the locked position in said receiving cavity forming a first clamping zone, and wherein the opposite leg is arranged to exert pressure against the opposite longitudinal and inner wing of said base section forming a second clamping zone.

In a preferred embodiment, the locking clip further comprises a disassembly tab extending from the branch, locked at the rear of said flange, outside the V or the U, to be protruding outside of said base profile when said clip is in the locked position. Thus, it can easily compress the locking clip to remove it and easily remove the lining sheet of said base profile.

Said base profile may further comprise at least one fixing lug which extends from the bottom of said longitudinal groove in a vertical direction or in a horizontal direction for fixing said base profile on a vertical wall or on a horizontal wall.

In the preferred embodiment, said fastening frame further comprises an L-shaped finishing angle arranged to fit on said base profile such that one of the legs of said finishing angle closes said receiving cavity while providing a free space between said receiving cavity and said branch to accommodate the excess of the lining sheet.

Said finishing angle and said base profile comprise reversible retaining means allowing a dismountable assembly of said finishing angle on said base profile, these retaining means possibly comprising a notched or serrated surface provided respectively on the outer face of said profile base and on the inner face of the corresponding branch of said finishing angle.

BRIEF DESCRIPTION OF THE DRAWINGS

The present invention and its advantages will appear better in the following description of several embodiments given as non-limiting examples, with reference to the appended drawings, in which:

FIGS. 5, 6, 7 and 8 are sections of four different shapes of a base profile used in the manufacture of the fastening frame according to the invention and corresponding to the four implantation examples illustrated in FIGS. 1 to 4, FIGS. 9A and 9B are respectively a section and a perspective view of a locking clip used in the manufacture of the fastening frame according to the invention, FIG. 10 is a section of a finishing angle used in the manufacture of the fastening frame according to the invention.

ILLUSTRATIONS OF THE INVENTION AND DIFFERENT WAYS OF MAKING IT

In the exemplary embodiments illustrated, the elements or identical parts bear the same reference numbers. With reference to the figures, the invention relates to a fastening frame 100, 200, 300, 400 for mounting a flexible lining sheet 1 stretched within said frame to create a false ceiling, a false wall, a double wall, a subwoofer, a false wall slab, or the like, the lining sheet 1 having dimensions greater than those of the frame.

Figure 1:
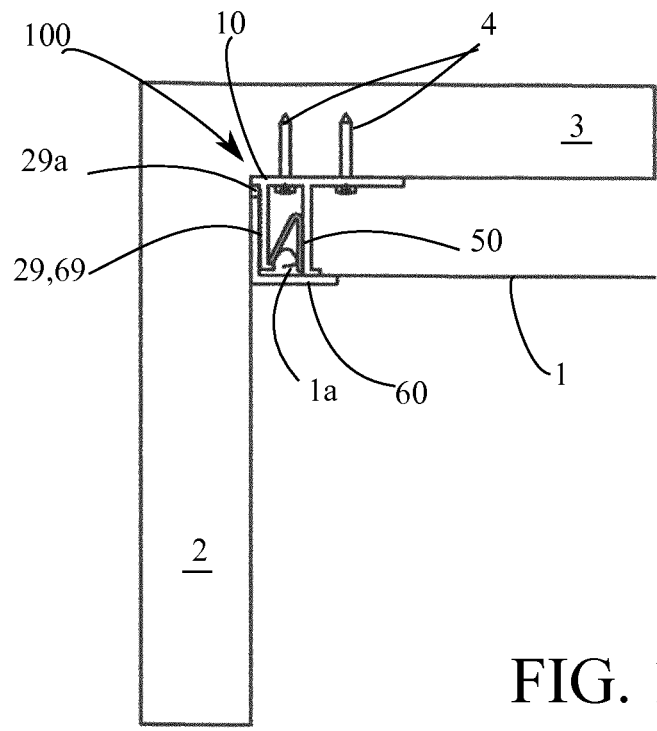
FIGS. 1, 2 and 3 are partial sectional views of three examples of implantation of a flexible lining sheet on a fastening frame attached to a wall according to the invention.
Figure 2:
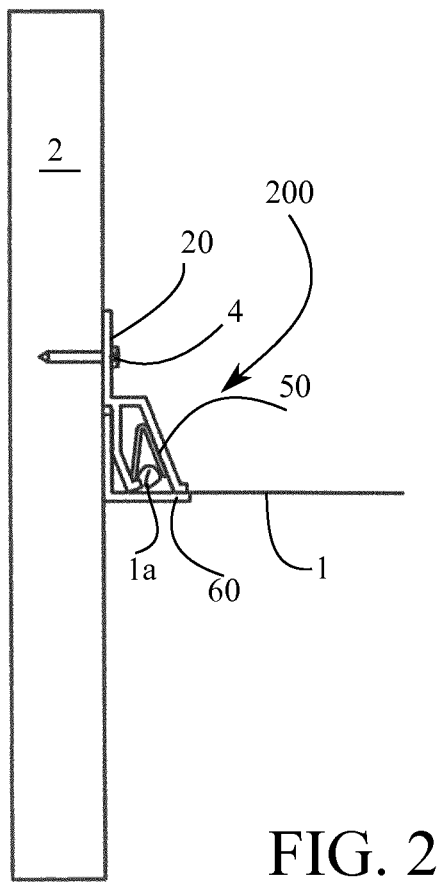
Figure 3:
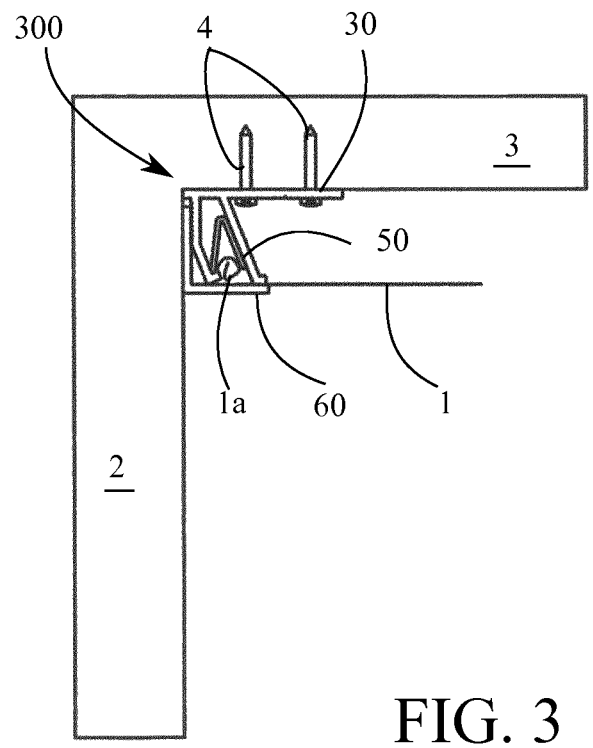
Figure 4:
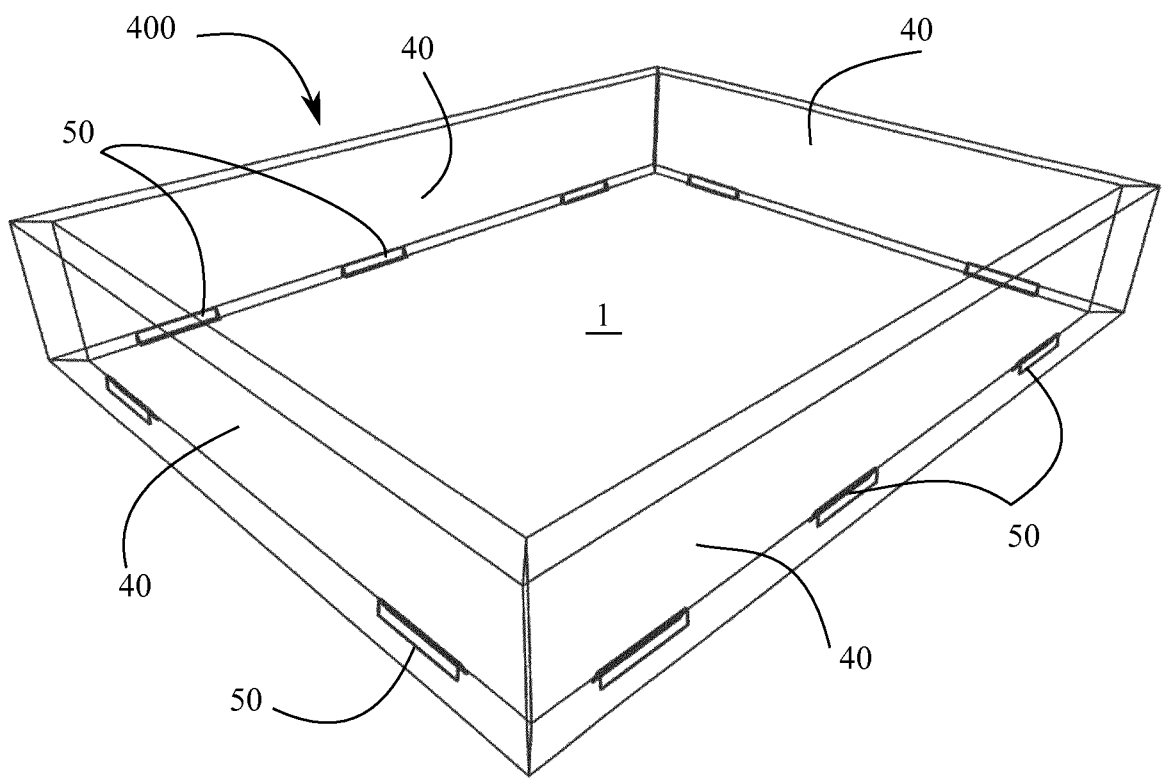
FIG. 4 is a perspective view of a fourth example of implantation of a flexible lining sheet on a self-supporting fastening frame according to the invention.
Figure 8:
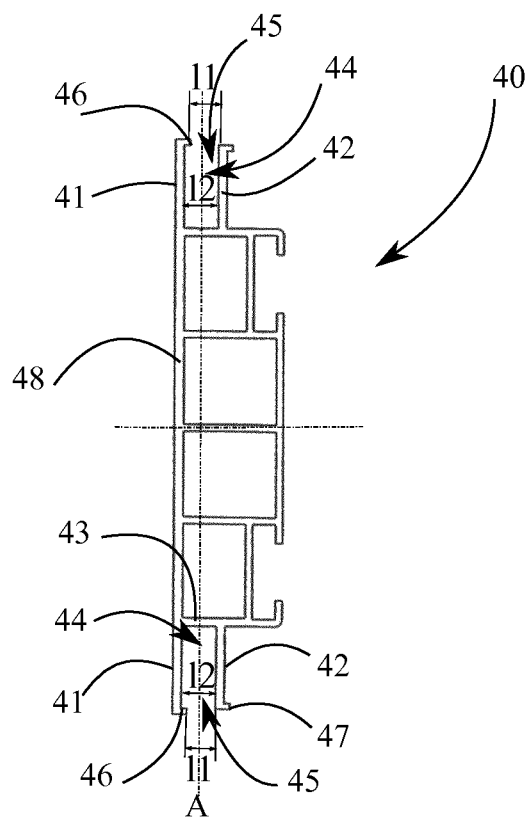

FIGS. 1 to 4 schematically illustrate some examples of implementation without these examples being limiting. In FIGS. 1, 3, the fastening frame 100, 300 is arranged to create a false ceiling near an existing ceiling 3. For this purpose, it is positioned in the angle formed between the walls 2 and the ceiling 3. It is fixed directly to the ceiling 3 by fixing screws 4, and the lining sheet 1 is mounted horizontally in said frame and parallel to the ceiling 3 at a distance from the ceiling 3 of the height of the fastening frame 100, 300. In FIG. 2, the attachment frame 200 is arranged to create a false ceiling distance from a ceiling (not shown) and lower the height of the room. For this purpose, it is positioned and fixed directly to the walls 2 by fixing screws 4, and the lining sheet 1 is mounted horizontally in said frame. In FIG. 4, the mounting frame 400 is self-supporting and arranged to create a room environment for example a light box, which can be suspended from a ceiling, attached to a wall, placed on a support, etc. horizontally, vertically or at an angle. Thus, this self-supporting mounting frame 400 is not attached directly to a wall. It can also be used to create false-slab or false-wall slabs to cover all or part of a surface. In an example not shown, the lining sheet 1 can also be stretched vertically along a wall, or to separate a room in two, for example using one or the other of the attachment frames 100, 200, 300.

To achieve these different implementations, different forms of base profiles 10, 20, 30, 40, illustrated in FIGS. 5 to 8, are used, which are assembled to form the fastening frames 100, 200, 300, 400, or by fixing them directly on an end-to-end wall to cover the perimeter of the wall to be covered, or by fixing them together to create a self-supporting mounting frame 400.

The lining sheet 1 is mounted in the base profiles 10, 20, 30, 40 of the fastening frames 100, 200, 300, 400 by means of locking clips 50, 500, illustrated more particularly in FIGS. 9A and 9B, and FIGS. 14A and 14B. Each locking clip 50, 500 is arranged to be fitted inside the base profiles simultaneously with said lining sheet 1 and serves to maintain said lining sheet 1 under tension by clamping, as explained below. A finishing edge 60, shown more particularly in FIG. 10, completes the fitting of said lining sheet 1 by covering the base profile 10, 20, 30, 40 of said fastening frame 100, 200, 300, 400 and masking the excess of the uncut lining sheet.

With reference more particularly to FIGS. 5 to 8, the base profiles 10, 20, 30, 40 are rectilinear elongate pieces, rigid or semi-rigid. They are preferably obtained by extrusion of a metallic material, such as for example aluminum or any other light metal alloy, non-corrosive and offering excellent resistance to bending, or by extrusion of a plastic material such as polyvinyl chloride (PVC) or acrylonitrile butadiene styrene (ABS), without these examples being limiting. Each base profile 10, 20, 30, 40 comprises two longitudinal rigid wings 11, 12, 21, 22; 41, 42, spaced from each other and assembled by a bottom 13, 23, 43 to form an open longitudinal groove defining a receiving cavity 14, 24, 44 provided with an inlet area 15, 25, 45. In the examples shown, the longitudinal wings 11, 12, 21, 22; 41, 42 extend in two substantially parallel planes, defining between them a receiving cavity 14, 24, 44 substantially U-shaped, and delimit between them the inlet area 15, 25, 45 of the receiving cavity 14, 24, 44 which also extends in a plane substantially parallel to said wings. For the fastening frames 100, 400, the longitudinal wings 11, 12; 41, 42 extend vertically or horizontally depending on the orientation of said base profile 10, 40. And for the fastening frames 200, 300, the longitudinal wings 21, 22 extend in planes inclined along the axis A with respect to the vertical or relative to the horizontal according to the orientation of said base section 20, 30. The angle of the inclination of the inlet area 25 may vary from 10 to 30° without these values being limiting. The advantage of this inclination along the axis A is to move the inlet area 25 away from the surface 2, 3 on which is fixed said profile to facilitate the introduction of the lining sheet 1 in said profile with a spatula 5 without being disturbed by the wall 2 (see FIG. 11). Of course, the receiving cavity section and the shape and orientation of the longitudinal wings can vary while providing the same functions.

The receiving cavity 14, 24, 44 provided in the base profiles 10, 20, 30, 40 comprises in all cases locking means of the locking clip 50 in the locked position inside said cavity so that it can clamp the lining sheet 1 which is mounted under tension within the fastening frame 100, 200, 300, 400. For this purpose, one of the longitudinal wings 11, 21, 41 comprises a flange 16, 26, 46 protruding, extending towards the other longitudinal flange 12, 22, 42, thus inside said cavity, having for effect of narrowing the entrance area 15, 25, 45 of the receiving cavity 14, 24, 44 and forming a block stop behind which the locking clip 50 is retained and cannot come out of said receiving cavity. The shape and the disposition of this block stop can vary while ensuring the same function. The other longitudinal wing 12, 22, 42 also comprises a flange 17, 27, 47 protruding, extending in the same direction as the flange 16, 26, 46, therefore inside said fastening frame 100, 200, 300, 400, having the effect of forming a smooth bearing surface, without sharp edge, or asperity, around which the lining sheet 1 bears when it is mounted stretched in said fastening frame. The shape and layout of the bearing surface can also vary by providing the same function.

In the base profiles 10, 20, 30, the longitudinal flange 11, 21 provided with the flange 16, 26 corresponds to the outer flange of said fastening frame 100, 200, 300. It is slightly shorter than the other longitudinal wing 12, 22 which is internal to said fastening frame, this so as not to interfere with the finishing angle 60 and to provide a storage space at the rear of the finishing angle 60 for the excess of the uncut lining sheet, as explained below. In the base profile 40, the longitudinal flange 41 provided with the flange 46 also corresponds to the outer flange of said fastening frame 400. It is slightly longer than the other longitudinal wing 42 which is inside said fastening frame, this so as not to interfere with the finishing angle 60 and also provide a storage space at the rear of the finishing angle 60 for the excess of uncut lining sheet. Again, these embodiments are not limiting and adapted to the technical constraints of the implementation of said lining sheet 1.

The base profiles 10, 20, 30 further comprise at least one fixing lug 18, 28, 38 which extends longitudinally from the bottom 13, 23 of the receiving cavity 14, 24, or in a vertical direction allowing fixing the base profile 20 on a vertical wall, in a horizontal direction for fixing the base profile 10, 30 on a horizontal wall. Of course, these fixing lugs 18, 28, 38 comprise perforations 6 distributed regularly over the length of said profiles to receive the fixing screws 4 serving to fix said profiles on the walls 2, 3 as illustrated in FIG. 3.

The base profile 40 is somewhat different since it is not intended to be fixed directly to a wall, but to constitute a self-supporting fastening frame 400. In the example shown in FIG. 8, it is symmetrical with respect to a transverse median plane and thus comprises two receiving cavities 44 in opposition, on either side of a central portion 48. The central portion 48 is hollow and ribbed to impart to said base section 40 a high mechanical resistance to bending. The two receiving cavities 44 thus make it possible to mount two facing lining sheets 1 arranged on either side of a box delimited by said lining sheets 1 and by said fastening frame 400. This box can for example receive luminous devices, audio, video, etc. to create room boxes. Of course, these examples are not limiting and any variant embodiment is conceivable.

With reference more particularly to FIGS. 9A and 9B, the locking clip 50 consists of a rectilinear section derived from a flexible section, preferably obtained by extrusion of a synthetic material such as, for example, polyvinyl chloride vinyl (PVC) or any other equivalent material. The flexible profile is cut into short profile sections whose length is much shorter than that of the sides of the fastening frame, for example between 4 and 8 centimeters without these values being limiting. In particular, each profile section comprises two rectilinear branches 51, 52, symmetrical or not, assembled by a folding zone 53 or curvature, to form a V or a U, giving the locking clip 50 its flexibility properties and elasticity. When it is at rest, unsolicited, in the so-called unlocked position, the locking clip 50 adopts an open natural position in which the spacing E at the end of its branches 51, 52 is greater than the width 11 of the area 15, 25, 45 as well as the width 12 of the receiving cavity 14, 24, 44 which follows said inlet area. Thus, during the introduction of the locking clip 50 in the receiving cavity 14, 24, 44 of the base profile 10, 20, 40, the wings 51, 52 are constrained towards each other to pass the inlet area 15, 25, 45, then move slightly apart while being held under stress when it is inside said receiving cavity 14, 24, 44. After the passage of the inlet area 15, 25, 45, the locking clip 50 opens very slightly, a value corresponding to the difference between the width 11 of the entry zone and the width 12 of said cavity, generating the blocking of one of its branches 51 at the rear of the flange 16, 26, 46 constituting a block stop defining the locked position of said clip which cannot come out of said cavity. In addition, the tension applied by the covering 1 on the locking clip 50 has the effect of off-centering it with respect to the axis A of said cavity, and of tilting it in the direction of the longitudinal wing 12, 22, 42 opposite of the block stop, thereby reinforcing its locking position and promoting the plane support of the opposite leg 52 of the locking clip 50 against said longitudinal wing. In this locked position, the locking clip 50 remains under stress and its branches 51, 52 exert a pressure force against the longitudinal wings 11, 12; 21, 22; 41, 42 which ensure a maintenance and effective clamping of the lining sheet 1 disposed between them.

Figure 14B:
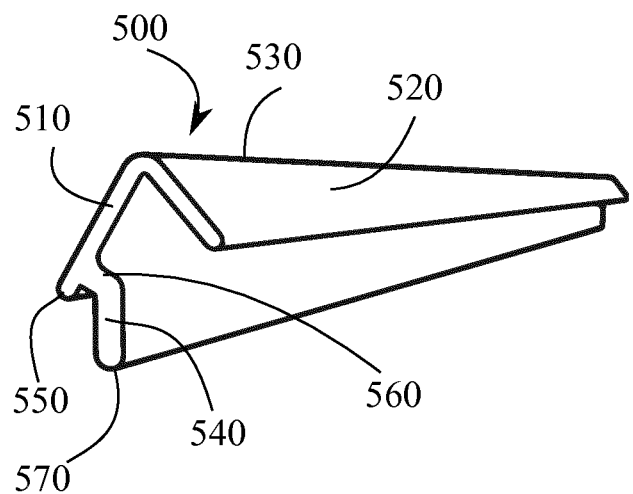
FIGS. 14A and 14B are respectively a section and a perspective view of a locking clip according to another variant embodiment.
Figure 14A:
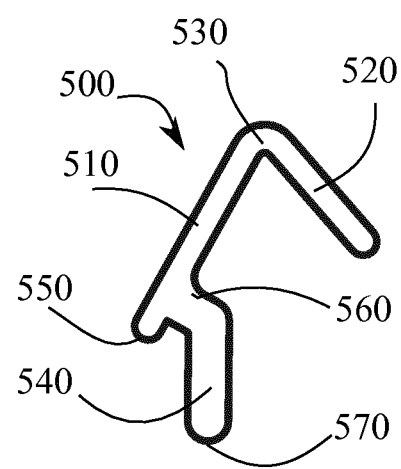

With particular reference to FIGS. 14A and 14B, the locking clip 500 is an improvement of the locking clip 50 described with reference to FIGS. 9A and 9B. It comprises in fact a disassembly tab 540 arranged to protrude outside the base profile 10, 20, 30, 40 when said clip is in the locked position, to access and unlock more easily to be able to removing it from said base section in order to disassemble or reposition said lining sheet 1. It is similar to the clip of the previous example and comprises a rectilinear section of flexible section, defining two branches 510, 520, symmetrical or not, assembled by a folding area 530 or curvature, to form a V or a U. One of its branches 510, 520 is extended outside the V or U by the dismounting tab 540. This dismounting tab 540 is rectilinear and preferably extends over the entire length of the profile section. It could also be discontinuous or punctual depending on the length of said locking clip. This dismounting tab 540 is provided more particularly on the branch 510 whose free end 550 is provided to lock behind the flange 16, 26, 46 of the base profile 10, 20, 30, 40 in said locked position. It is arranged between the branches 510 and 520, connected to the branch 510 by a connecting zone 560 slightly away from its free end 550. The connecting zone 560 extends substantially in a plane perpendicular to that of the branch 510, and the dismounting tab 540 extends in a plane intersecting that of the branch 510 by an acute angle. Any other equivalent configuration of a dismounting tab, which extends continuously or discontinuously along the length of the profile section, may also be suitable, the essential point being that it projects a few millimeters outside the base profile 10, 20, 30, 40 when the locking clip 500 is in the locked position, to access it in order to exert a manual traction towards the inner longitudinal wing 22 of the base profile 20 to release the free end 550 of the clip from the flange 26 of said profile and release the locking clip 500.

We speak of "sections of profile" to describe the locking clip 50, 500, a section of which, by nature, has a length less than the length provided for the base profiles 10, 20, 30, 40, since the locking clip 50, 500 is not intended to extend continuously in each basic section. This constructive choice thus makes it possible to further facilitate the method of mounting the lining sheet 1 as explained below.

The fastening frame 100, 200, 300, 400 further comprises a finishing angle 60, shown in greater detail in FIG. 10, which consists of a flexible section, preferably obtained by extrusion of a synthetic material such as by way of example of polyvinyl chloride (PVC) or any other equivalent material. In particular, each finishing corner 60 comprises two branches 61, 62, assembled by a fold zone 63 at right angles, to form an L. The branches 61, 62 are of equal length or not, and their outer face can be coated a decorative surface since at least one of the branches of the finishing angle 60 is intended to remain visible outside said fastening frame 100, 200, 300, 400 after mounting said lining sheet 1. This decorative surface can be made for any known means, such as painting, lacquering, application of an adhesive decor film, co-extrusion with a decor film, etc.

This finishing angle 60 further comprises retaining means complementary to those provided in correspondence on the base profiles 10, 20, 30, 40, these retaining means being reversible, in that they allow a dismountable assembly of said finishing angle on said base profile. In the examples illustrated in FIGS. 1 to 3, 13 and 15, these reversible retaining means comprise a notched or serrated surface 69, 19, 29 respectively provided on the outer face of said base profile 10, 20, 30 and on the face interior of the vertical branch 61 of the finishing angle 60. For this purpose, the base profiles 10, 20, 30 comprise an interlocking zone 19a, 29a located outside of said fastening frame 100, 200, 300 and defined by the longitudinal wing 11, 21 outside, an extension the bottom 13, 23 outside said profile, and the surface 2, 3 on which is fixed said base profile 10, 20, 30. In the base profiles 20, 30 in which the longitudinal wings 21, 22 are inclined along the axis A, the outer flange 21 has a vertical portion 21a between the bottom 23 and the inclined section 21b, the vertical section 21a delimiting said interlocking area 29a.

POSSIBILITIES OF INDUSTRIAL APPLICATION

The attachment frame 100, 200, 300, 400 according to the invention as just described with its various parts: base profiles 10, 20, 30, 40, locking clips 50, 500, and finishing angle 60, has the advantage of being offered for sale in kit. The lining sheet 1 meanwhile can be manufactured continuously, and sold by the meter or roll. Of course, any other means of conditioning can be envisaged. We will choose a lining sheet 1 whose dimensions are greater than those of the fastening frame. To mount the lining sheet 1 on a fastening frame 100, 200, 300, 400, the assembly method according to the invention consists in assembling base profiles 10, 20, 30, 40 according to the desired implantation, either by fixing them on a wall 2, or a ceiling 3, or by fixing them together to form a self-supporting frame 400. Then, the locking clips 50, 500 are used with a standard spatula-type commercial insertion tool provided with a flat blade 5*a*. The terms "edge of the lining sheet" or "edge to be introduced" used in the remainder of the description must be understood as an edging zone situated parallel to and at a distance from the end or edge of the lining sheet.

Figure 11:
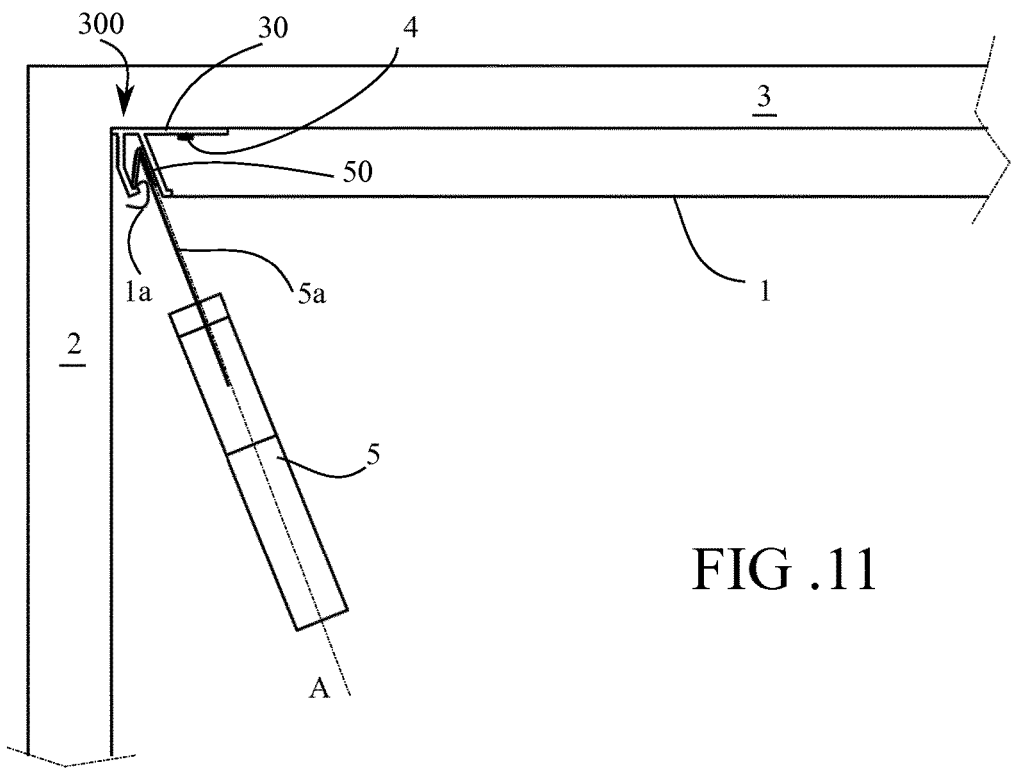
FIG. 11 is a side view showing a step of mounting the flexible lining sheet in a fastening frame according to the invention for the implantation of FIG. 3.

To introduce an edge of the lining sheet 1 into the receiving cavity 14, 24, 44 of a base profile 10, 20, 30, 40 and with reference to FIG. 11:

an excess of lining sheet is reserved beyond the edge to be introduced, a locking clip 50, 500 is inserted between the insertion tool 5 and the edge of the covering 1 to be inserted so that the insertion tool is not in contact with said lining sheet, the locking clip 50, 500 and simultaneously the edge of the covering 1 in the receiving cavity 14, 24, 44 are pushed in axis A to the locked position of the locking clip 50, 500, which intervenes when the locking clip 50, 500 is housed in said receiving cavity, in which locking position the edge of the lining sheet 1 is retained by clamping between the locking clip 50, 500 and said housing as explained above, the insertion tool 5 is removed from the locking clip 50, 500 which remains in the locked position in said cavity, these operations are repeated along the edges of the lining sheet 1 to be introduced and on the periphery of said fastening frame 30, using at each new operation a new locking clip 50, 500, and positioning the locking clips preferably at a distance from each other, for example with an interval of 5 to 15 cm without these values being limiting, and at the end of the assembly, if necessary cut the excess of the lining sheet 1*a* to shorten it and it is inserted using said tool 5 in the receiving cavity 14, 24, 44, either directly or in the V-shaped or U-shaped locking clips 50, 500, to thus have a lining sheet stock 1 facilitating its disassembly and its reassembly.

To stretch, adjust or remove the covering 1 of the fastening frame 300, one or more locking clips 50, 500 are unlocked. In the case of the locking clip 50 according to FIGS. 9A and 9B, it suffices to draw on the excess of the lining sheet remaining outside the receiving cavity 24, extending from the longitudinal wing 21, provided with the blocking stop. This manual pull exerted on the excess of the lining sheet has the effect of compressing the fastener clip 50 by bringing the branch 51 to the branch 52, until the branch 51 escapes from the flange 26, allowing the output of the clip 50 of said receiving cavity 24, simultaneously with the corresponding edge of said lining sheet 1. In the case of the locking clip 500 according to FIGS. 14A and 14B, it is sufficient to exert a manual pull on the disassembly tab 540 to compress the fixing clip 500 by bringing the branch 510 towards the branch 520, until that the branch 510 escapes from the flange 26, allowing the output of the locking clip 500 of said receiving cavity 24, and simultaneously the output of the corresponding edge of said lining sheet 1.

When the assembly of the entire lining sheet 1 on the fastening frame 300 is completed, it is necessary to cut with a cutter-type cutting tool a portion of the excess lining sheet 1*a*, only if necessary, for keeping an excess of about 3 to 6 centimeters allowing easy disassembly and reassembly, without these values being limiting. Then this excess of the lining sheet 1*a* is pushed inside the receiving cavity 14, 24, 44, either in the V or U formed by the locking clip 50, 500 where there is a locking clip, or inside the base profile 10, 20, 30, 40 where there is no locking clip. This excess of lining sheet will subsequently be unfolded, and will be convenient for disassembly and reassembly of the lining sheet 1. Then, a finishing angle 60 is placed all along said fastening frame 300 to hide the base profiles 30 and retain the excess of the lining sheet remaining outside said frame and entered into said receiving cavity 14, 24, 44. For this purpose, the finishing corner 60 is pressed against the lining sheet 1 and the corresponding base profile 10, 20, 30, 40 until its branch 62 comes into abutment against the flange 17, 27, 46 of the longest longitudinal wing 12, 22, 41 of said profile, against the free end 570 of the dismounting tab 540 of the locking clip 500. The installation of this finishing angle 60 makes it possible to aesthetically finish the assembly of said lining sheet 1 and to keep an excess of lining sheet 1*a*, instead of cutting it flush like in all the present laying systems, in order to be able, if necessary, to dismantle and reassemble easily the lining sheet 1.

Figure 12:
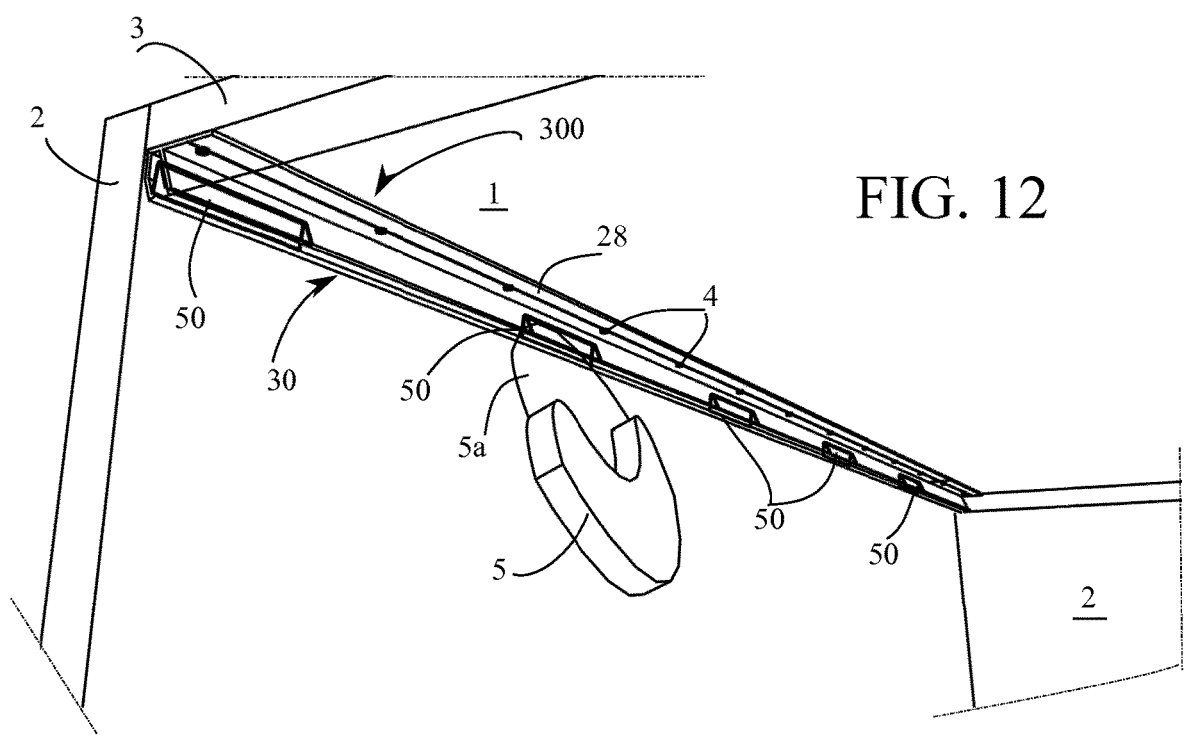
FIG. 12 is a perspective view of the mounting step of FIG. 11.

FIG. 12 shows, by transparency, part of a false ceiling in progress on a fastening frame 300, according to the configuration of FIG. 3, with a lining sheet 1 stretched with the aid of locking clips 50 of FIGS. 9A and 9B, distributed substantially evenly along the base profiles 30 at a distance from each other. And FIG. 13 shows a section of the finished fastening frame 300 on which the finishing corner 60 has been placed.

Figure 13:
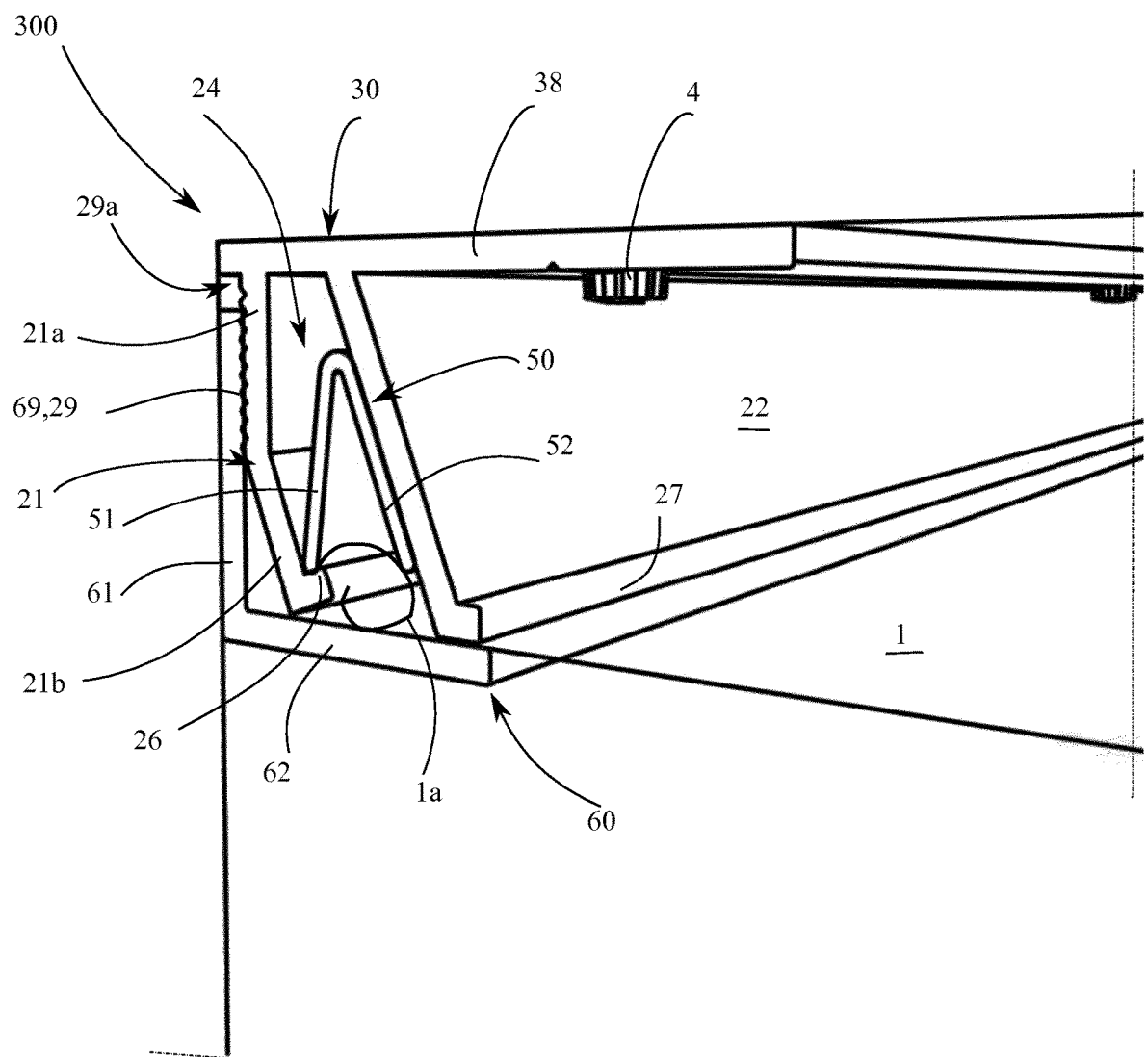
FIG. 13 is a perspective view of the lining sheet after the assembly forming a false ceiling.
Figure 15:
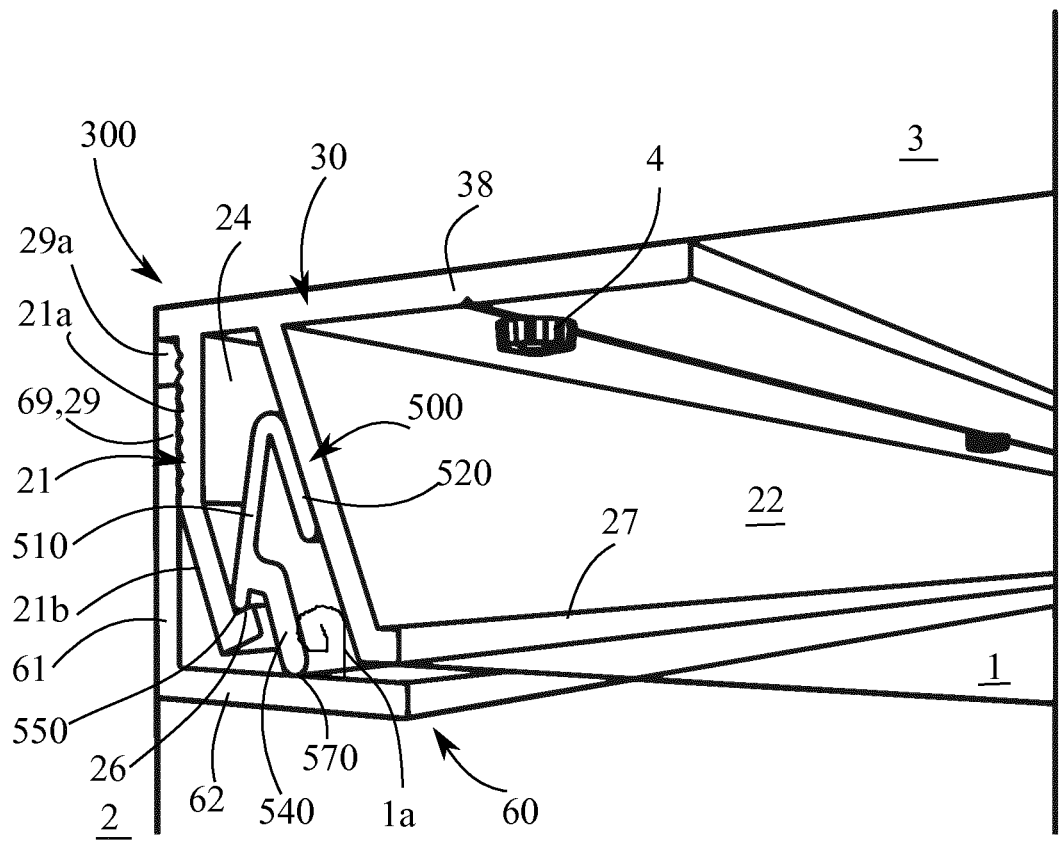
FIG. 15 is a view similar to FIG. 13 of a lining sheet after mounting by means of the locking clip of FIGS. 14A and 14B.

FIG. 15 is similar to FIG. 13 and shows a section of the fastening frame 300 of a false ceiling, according to the configuration of FIG. 3, with a covering 1 stretched with locking clips 500 of FIGS. 14A and 14B. In the locked position, it clearly appears that the dismounting tab 540 of the locking clip 500 is slightly protruding outside the base profile 20, while remaining at a distance from the longitudinal inner wing 22 so as not to obstruct the area of input 25 of the receiving cavity 24. In this configuration, the finishing corner 60 is pressed against the locking clip 500, its branch 62 abutting against the free end 570 of the dismounting tab 540. Depending on the length of the dismounting tab 540, a clearance can persist between the finishing angle 60 and the lining sheet 1 which remains insignificant and does not affect the aesthetics of the false ceiling or the false wall. In case of disassembly or repositioning of the lining sheet 1, the locking clip 500 can be extracted from the base profile 30 very easily by exerting a manual pull on the disassembly tab 540 accessible to release it from the flange 26 forming the stopper.

It is clear from this description that the invention achieves the goals set, namely a mounting system of a flexible lining sheet on a fastening frame accessible to any handyman, can be mounted, disassembled and reassembled, easily, without deteriorating the lining sheet 1 being that it is introduced into said frame by means of clips protecting it from the insertion tool, then kept under tension by pinching by the same clips between smooth surfaces, without relief or notching.

The present invention is not limited to the embodiments described but extends to any modification and variation obvious to a person skilled in the art.

The invention claimed is:

1. A method for mounting a flexible lining sheet (1) stretched over a fastening frame (100, 200, 300, 400), the lining sheet having dimensions greater than those of the frame, the fastening frame comprising at least one assembly of base profiles (10, 20, 30, 40), each base profile having a receiving cavity (14, 24, 44) for an edge of the lining sheet (1) and clamping means arranged to retain the edge of the lining sheet in the receiving cavity, wherein the edge of the lining sheet is introduced into the receiving cavity by means of an insertion tool (5) and is kept under tension by the clamping means, the method comprising:

using a plurality of locking clips (50, 500), having a V-shaped or U-shaped section which are separate pieces of the base profiles (10, 20, 30, 40) and of the lining sheet (1) and which have a shorter length than the base profiles, as clamping means, arranging each locking clip to enter and remain in a locked position in the receiving cavity (14, 24, 44), and to introduce an edge of the lining sheet (1) into the receiving cavity of a base profile, reserving an excess of lining sheet (1a), beyond the edge to be introduced, interposing a locking clip (50, 500) between the insertion tool (5) and the edge of the lining sheet (1) to be introduced, simultaneously pushing the locking clip (50, 500) and the edge of the lining sheet (1) to be introduced into the receiving housing (14, 24, 44) are until the locked position of the locking clip (50, 500) is achieved, wherein the edge of the lining sheet (1) is clamped between the locking clip (50, 500) and the cavity, removing the insertion tool (5), and Repeating the above steps along the edges of the lining sheet (1) to be introduced and on the periphery of the fastening frame (100, 200, 300, 400) using, for each new operation, a new locking clip (50, 500) positioned at a distance from the previous one, and entering the excess of lining sheet (1a) directly into the receiving cavity (14, 24, 44) or in the section V-shaped or U-shaped of the locking clips (50, 500).

2. The mounting method according to claim 1, further comprising, to stretch, adjust or remove the lining sheet (1) with respect to the fastening frame (100, 200, 300, 400), unlocking one or more locking clips (50) by pulling on the excess of lining sheet (1a) remained outside the fastening frame to compress the fastening clip (50) and extract the fastening clip (50) from the receiving cavity simultaneously to the corresponding edge of the lining sheet (1).

3. The mounting method according to claim 1, further comprising, to stretch, adjust or remove the lining sheet (1) relative to the fastening frame (100, 200, 300, 400), unlocking one or more locking clips (500) by pulling on a dismounting tab (540) provided on the locking clip (500), for compressing the fastening clip (500), extracting the fastening clip (500) from the receiving cavity and simultaneously extracting the corresponding edge of the lining sheet (1).

4. The mounting method according to claim 1, further comprising, after mounting the lining sheet (1) on the fastening frame (100, 200, 300, 400), placing a finishing angle (60) on each base profile (10, 20, 30, 40) for closing the receiving cavity (14, 24, 44) and retaining the excess of lining sheet (1a).

* * * * *